Jan. 1, 1935.  J. P. WALKER ET AL  1,986,168
LIQUID AND GAS SEPARATOR
Filed April 20, 1931   4 Sheets-Sheet 1

Inventors
Jay P. Walker
Elmer R. Williams

By
Jack A. Ashley
Attorney

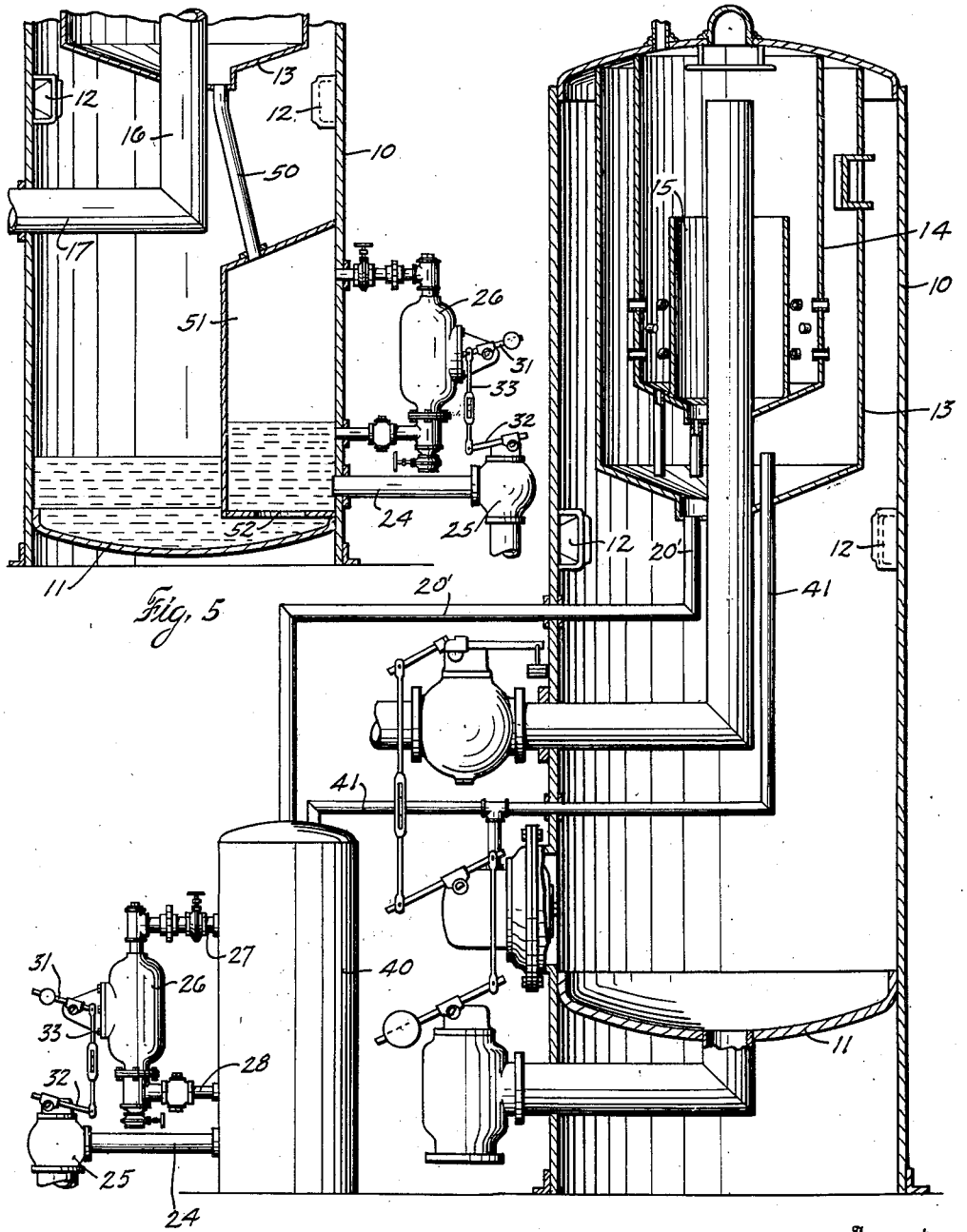

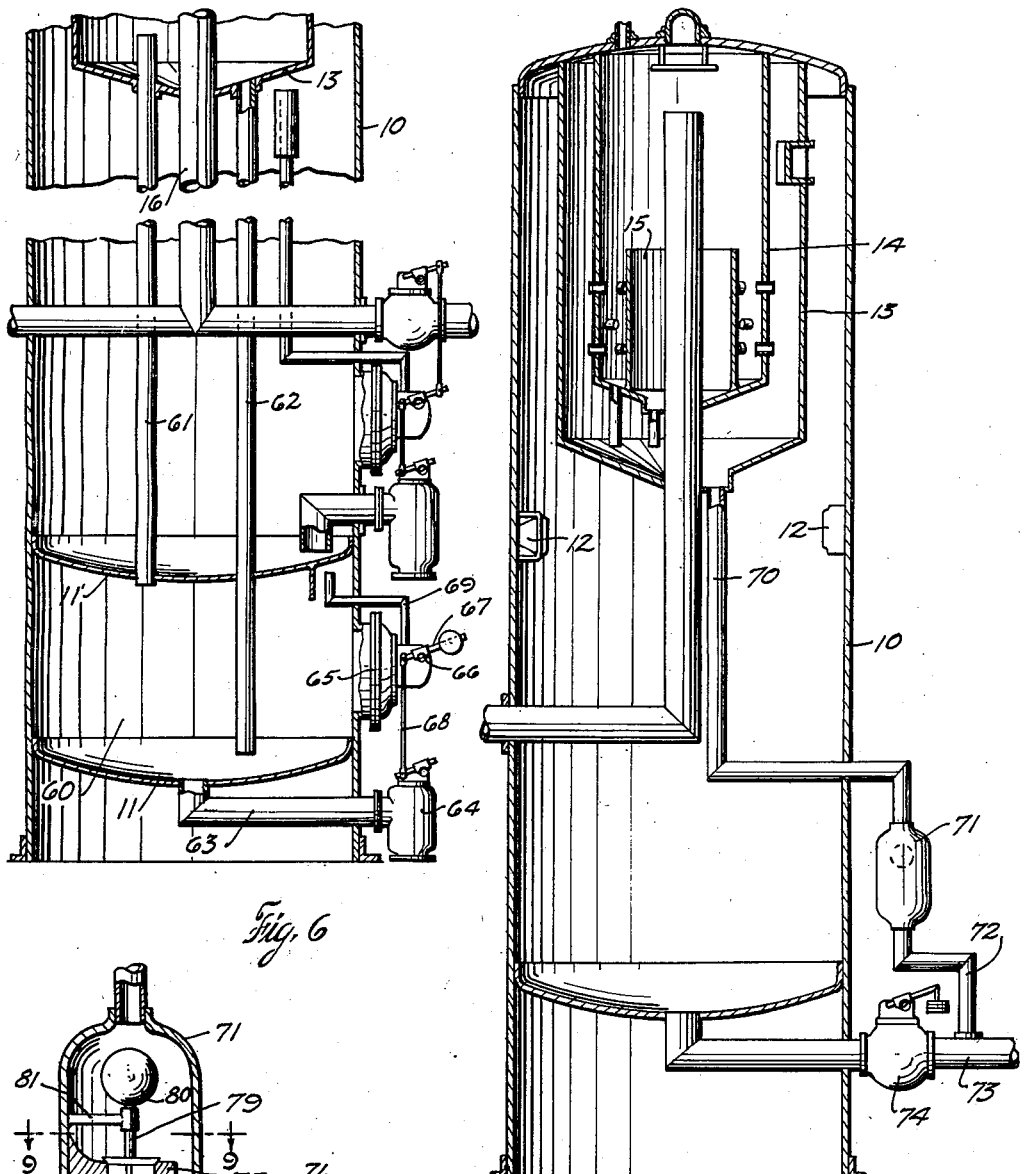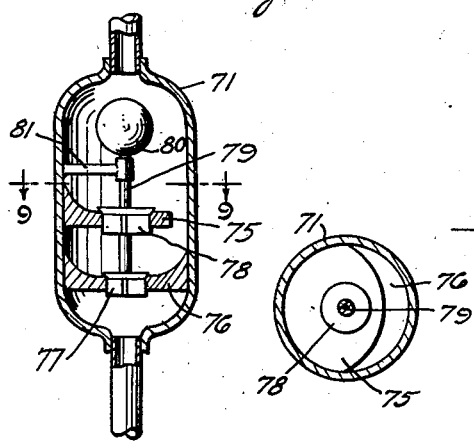

Patented Jan. 1, 1935

1,986,168

UNITED STATES PATENT OFFICE 1,986,168

LIQUID AND GAS SEPARATOR

Jay P. Walker and Elmer R. Williams, Tulsa, Okla., assignors to National Tank Company, Tulsa, Okla., a corporation of Oklahoma Application April 20, 1931, Serial No. 531,289

13 Claims. (Cl. 183—2.7)

This invention relates to new and useful improvements in liquid and gas separators.

The invention has particularly to do with separators used in oil fields and connected to oil wells for separating the gas from the oil and other liquids.

In this type of separator the oil or liquid is collected in the bottom of the separator tank and the gas is usually brought into contact with baffles or deflectors in the upper portion of the tank for the purpose of scrubbing out the entrained liquids. It is customary to have drain pipes leading from the baffles to the oil chamber of the separator.

Certain difficulties have been encountered in connection with the drain pipes. If the drain pipe is not carried below the normal oil level, gases entering the tank are likely to enter the drain pipe from its lower end instead of passing around the baffles. Where the drain pipe is carried below the oil level the oil has a tendency to rise in said pipe and is sometimes forced up into the baffles by differences in pressure and into the path of the gases going around the baffles. This condition is aggravated where the well heads and the oil rises to an abnormal level. Where oil is carried up into the baffles it will be picked up by the gas and carried out in the gas discharge line, thus defeating the purpose of the separator.

One object of the invention is to segregate the discharge of the drain pipe from the body of oil collecting in the lower portion of the tank, as well as from the influent. By separately discharging the oil from the drain pipe it is obvious that neither oil nor gas introduced into the tank or collected in the tank can enter the lower end of the drain pipe and thus find its way into the baffles or other separating elements within the upper portion of the tank.

Another object of the invention is to provide a separate container for the drained oil and to equip the same with an automatic discharge, whereby the container is dumped when a predetermined amount of oil has been collected therein.

A construction designed to carry out the invention will be hereinafter described together with other features of the invention.

Figure 1:
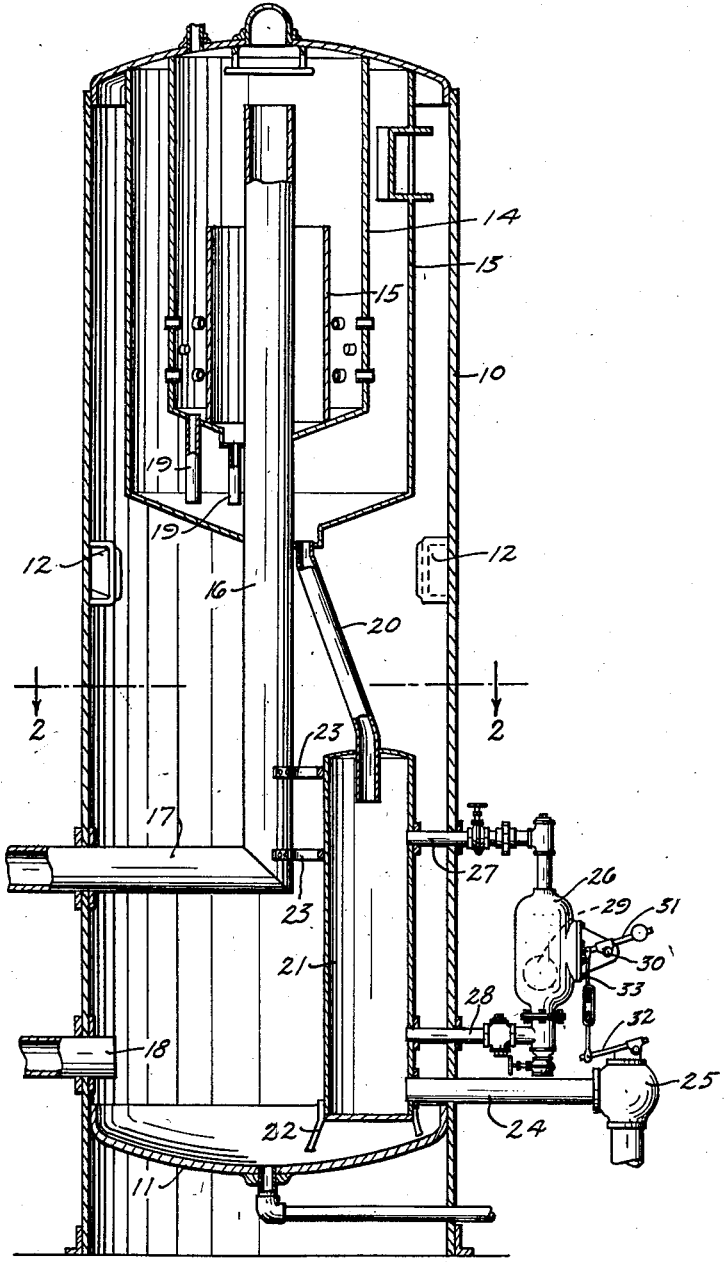
Figure 2:
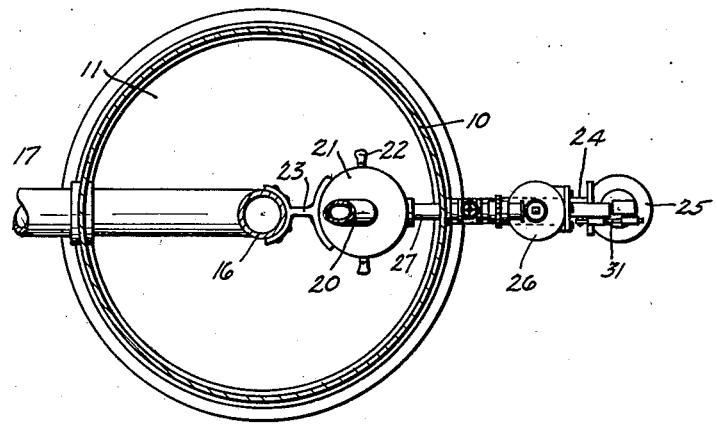
Figure 3:
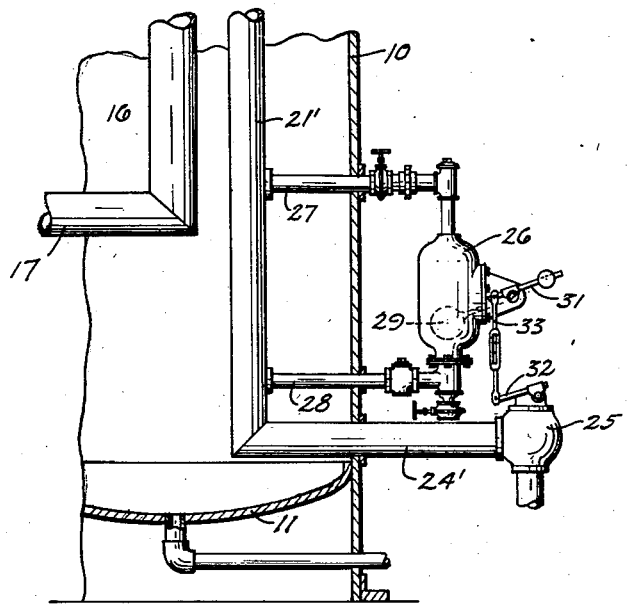

The invention will be more readily understood from a reading of the following specification and by reference to the accompanying drawings in which an example of the invention is shown, and wherein:

Figure 1 is a vertical sectional view showing a separator constructed in accordance with the invention, Figure 2 is a horizontal cross-sectional view taken on the line 2—2 of Figure 1, Figure 3 is a partial elevation of another form of the invention, Figure 4 is an elevation showing still another form of the invention, Figure 5 is a partial vertical sectional view of still another form of the invention, Figure 6 is a partial vertical sectional view of a modified form of the invention, Figure 7 is a partial vertical sectional view of another form of the invention, Figure 8 is a vertical sectional view of the float chamber of Figure 7, and Figure 9 is a horizontal cross-sectional view taken on the line 9—9 of Figure 8.

In the drawings the numeral 10 designates an upright metal tank having a false bottom 11. Inlets 12 are provided at the middle height of the tank and above these inlets are arranged concentric baffles or scrubbing shells 13, 14 and 15, respectively. A gas discharge pipe 16 leads axially of the tank from the shells and has a lateral discharge pipe 17 at its lower end extending through the wall of the tank. An oil discharge pipe 18 also extends through the side wall of the tank just above the bottom 11. The structure shown and described is typical and the invention is not to be limited thereto.

The shells 14 and 15 have drain pipes 19 discharging into the shell 13 and a common drain pipe 20 leads from the bottom of the shell 13. The oil which drains from all of the baffles or shells is finally carried off by the drain pipe 20. It has been the practice to terminate this drain pipe below the normal oil level so as to prevent the gases and influent from entering the lower end thereof.

It is evident that so long as the lower end of the drain pipe is not opened at its lower end so that either oil or gas may enter from the tank, the difficulties hereinbefore set forth would be overcome, and it is unnecessary to illustrate the different manners in which this feature may be carried out. The invention contemplates a number of structures whereby the desired result may be obtained.

In Figure 1 a separate container 21 in the form of a vertically elongated tank is shown. This tank is supported on legs 22 resting on the bottom 11 and is attached to the gas discharge pipe 16 by braces 23. The drain pipe 20 enters the top of the tank 21 and extends downward therein a short distance, a fluid tight joint being made between the pipe and the tank, which latter must be tightly closed against the entrance of gas and oil except from the pipe 20. A discharge pipe 24 connected with the bottom of the tank 21 leads through the side wall of the tank 10 and has an outlet valve 25 secured on its outer end. A float chamber 26 is connected with the tank 21 by pipes 27 and 28.

In order to operate the valve 25, a float 29 is mounted in the chamber 26 and attached to a rock shaft 30 in the usual manner. A lever 31 fastened on the rock shaft is connected with the lever 32 of the valve 25 by a link 33. When the oil in the tank 21 reaches a pre-determined height the oil which has flowed into the chamber 26 through the pipe 28 will raise the float 29 and thus operate the parts, whereby the valve 25 will be opened and the tank 21 thus drained until the float reaches a lower level and closes the valve.

Suitable control valves (Figure 4) are attached to the pipes 17 and 18 so as to control the discharge of oil and gas from the tank, as is customary in this type of separator. Under ordinary conditions a normal oil level is carried and the separator operates satisfactorily. When the well heads the increase in oil is likely to be such as to cause it to rise to an abnormal height in the tank 10. It will be seen that no matter what the condition is neither oil nor gas can enter the lower end of the drain pipe 20, and unless oil overflows into the shell 13 from the tank 10, it cannot enter the same by the drain pipe.

It is obvious that there will be a difference in pressure between the fluids in the tank 10 and those in the shell 13 and the latter will be lower. So long as the lower end of the drain pipe is not exposed to the pressure of the fluids in the tank 10 the chance of the high pressure forcing the oil up through the drain pipe into the shell is overcome and while it is most satisfactory to entirely shut off the discharge end of the drain pipe from the body of oil accumulating in the tank 10, it is not absolutely necessary if the proper structure is used. Some means for counteracting the upward flow of the oil through the drain pipe must, of course, be used.

In Figure 3 a slight modification of the structure is shown where the equivalent of the tank 21 is produced by using a drain pipe 21' of sufficient diameter, when combined with the discharge pipe 24', to collect the drained oil and properly dump it. It will be noted that in both Figures 1 and 3 the drain pipe would have sufficient diameter to provide a vent for gas accumulating either in the tank 21 or in the pipe 21'. It would seldom occur that the amount of oil delivered to the drain pipe would so completely fill it as to prevent draining. Otherwise, Figure 3 is substantially the same as Figure 1.

In Figure 4 a separate tank 40 similar to the tank 21 is placed exteriorly of the tank 10 and the drain pipe 20' enters the top of this tank. In this form a small vent pipe 41 extends from the top of the tank 40 into the tank 10 and up into the shell 13. The same valve 25, float chamber 26 and other connections as are used in Figure 1 are attached to the tank 40. The tank 10 of course has separate outlets for the oil and gas.

The oil and gas outlets may be operated by any suitable means, such as a diaphragm control, which is fully described in the application of Elmer R. Williams, filed May 15, 1931, Serial No. 537,559.

In Figure 5 I have shown another form of the invention in which the discharge from the drain pipe is not entirely shut off from the oil collected in the bottom of the tank 10. In this form a drain pipe 50 leads from the shell 13 down to the top of a separate chamber or tank 51 secured to the inner side of the tank 10. This chamber has an opening 52 in its bottom and is equipped with the same float and valve connection as Figure 1. The bottom of the chamber 51 is so close to the bottom 11 of the tank as to admit substantially quiet oil to the tank 51 and while the oil in the chamber 51 will rise to a higher level than the oil in the tank 10, it will not be forced upward into the pipe 50. This pipe 50 should be large enough to vent the tank 51 and prevent the accumulation of gas therein. Separate outlets for the gas and oil in the tank 10 are provided as in the other forms.

I have illustrated another structure in Figure 6 showing a further modification of the invention. The tank 10 has a second false bottom 11' spaced above the bottom 11. This forms a separate drain chamber or tank 60 at the bottom of the tank 10. A vent pipe 61 extends from the bottom 11' up into the shell 13 and a drain pipe 62 extends from the bottom of the shell, down through the false bottom 11' to a point just above the bottom 11, whereby the lower end of the drain pipe is immersed in the drained liquid collected in the chamber 60. The tank 10 above the bottom 11' has suitable liquid and gas outlets which are not a part of the invention.

A discharge pipe 63 extends from the bottom 11 to an outlet valve 64. A diaphragm operator 65 is connected to the chamber 60 so as to be operated by the liquid therein. The operator has the usual rock shaft 66 carrying a weighted lever 67 connected with the valve by a link 68. A vent pipe 69 extends from the hood of the operator to the top of the chamber 60. Gas collecting in the chamber is carried by the vent pipe up into the shell 13 and also the pressures in the chamber and the shell are thus equalized. When the drained liquids in the chamber 60 reach a normal level the diaphragm operator will be actuated and the outlet valve 64 opened, thus dumping the chamber.

A very simple form of the invention is illustrated in Figures 7, 8 and 9. The pipe 70 is carried from the bottom of the shell 13 down through the side wall of the tank 10 and is connected to the top of a float chamber 71. A discharge pipe 72 leads from the bottom of the float chamber to the liquid outlet pipe 73 beyond the outlet valve 74.

In the float chamber 71 I provide valve seat partitions 75 and 76 each having a valve seat. A valve 77 engages in the seat of the partition 76, while a larger valve 78 engages in the seat of the partition 75. These valves are mounted on a stem 79. The partition 75 does not extend entirely across the chamber and this permits the oil pressure to equalize on both sides of the valve 78. A float 80 is fastened on the upper end of the stem which works through a guide 81.

The collected liquids from the shell 13 are drained by the pipe 70 into the float chamber 71. When the liquids in the chamber rise high enough the float 80 will be lifted, thus unseating the valves. Ordinarily the drain baffle in a separator leads into and discharges into the liquid which is collected in the bottom of the tank, and as the influent in most separators is discharged into the collected liquid, what is known as "separation agitation" is set up. The liquids separated from the influent falling into the collected liquid agitate the same which frequently causes it to foam.

1,986,168　3

Various changes in the size and shape of the different parts, as well as modifications and alterations, may be made within the scope of the appended claims.

Having illustrated and described preferred forms of the invention, what we claim, is:

1. In a liquid and gas separator, an upright tank having an influent inlet for introducing both liquid and gas into said tank, said tank also having a liquid collecting chamber located in its bottom, a scrubbing baffle in the upper portion of the tank exposed to the influent, a gas conductor leading from the tank and the baffle, a liquid conductor leading from the collection chamber of the tank, a drain pipe leading from the baffle, a container within the tank connected with the discharge end of the drain pipe, means for maintaining a liquid level in the tank, a liquid outlet for the container, a valve normally closing the liquid outlet of the container, and means for opening and closing said valve connected with the container and actuated by the rise and fall of the liquid therein, the liquid conductor leading from the tank being free from connection with the container.

2. In a liquid and gas separator, an upright tank having an opening for admitting a mixture of liquid and gas, said tank also having a liquid collecting chamber at its bottom, a scrubbing baffle in the upper portion of the tank open to receive gaseous fluids rising from the lower portion of said tank and exposed to the influent, a gas conductor leading from the tank and the baffle, a drain pipe leading downwardly from the baffle, a container within the tank connected with the lower end of the drain pipe in which drained liquid is collected free from separation agitation, a liquid outlet extending from the container, a valve for opening and closing said outlet, and means connected with the container and the valve and actuated by the rise and fall of the liquid in the container for operating the valve and maintaining a liquid level in said container.

3. In a liquid and gas separator, an upright tank having an influent inlet for introducing both liquid and gas into said tank, said tank also having a liquid collecting chamber located in its bottom, a scrubbing baffle in the upper portion of the tank, a gas conductor leading from the tank and the baffle, a separate container within the lower portion of the upright tank, a drain pipe leading from the baffle to the separate container, and a liquid conductor leading from the separate container.

4. In a liquid and gas separator, an upright tank having an influent inlet for introducing both liquid and gas into said tank, said tank also having a liquid collecting chamber located in its bottom, a scrubbing baffle in the upper portion of the tank, a gas conductor leading from the tank and the baffle, a separate container within the lower portion of the upright tank, a drain pipe leading from the baffle to the separate container, a liquid conductor leading from the separate container, a valve connected with the liquid conductor, and means connected with the separate container and the valve operated by the rise and fall of the liquid in the container for operating said valve.

5. In a liquid and gas separator, an upright tank having an influent inlet for introducing both liquid and gas into said tank, said tank also having a liquid collecting chamber located in its bottom, a scrubbing baffle in the upper portion of the tank exposed to the influent, a gas conductor leading from the tank and the baffle, a separate container within the tank, and a drain pipe extending from the baffle to the container for draining liquid from the baffle to said container and being of such size as to form a vent for upwardly flowing gas while liquid is flowing downwardly therethrough.

6. In a liquid and gas separator, an upright tank having an inlet for admitting a mixture of liquid and gas and also provided with a liquid collecting chamber below its inlet, a scrubbing baffle in the upper portion of the tank exposed to the influent, a container within the lower portion of the tank and extending below the oil level therein having an opening in its bottom for receiving liquid from the collection chamber of said tank, a drain pipe leading from the baffle to the container, a liquid outlet leading from the container, and a valve for said liquid outlet having operating means actuated by the rise and fall of the liquid in the container.

7. In a liquid and gas separator, an upright tank having an inlet for introducing a mixture of liquid and gas into said tank, the tank having a liquid collection chamber at its bottom, a cylindrical baffle in the upper portion of the tank above the inlet thereof exposed to the influent, a separate container within said tank, a drain pipe leading from the bottom of the baffle to the container for collecting drained liquid in said container free from separation agitation, said drain pipe being free from traps, a liquid discharge conductor leading from the lower portion of the container, a valve connected with said conductor, and valve operating means connected with said valve and connected with the container above the liquid outlet.

8. A combination separator including a vertically disposed tank, a fluid inlet intermediate the vertical extremities of said tank, a settling chamber below said inlet, a liquid and gas separating unit in said tank above said inlet, means for conducting gas from said separating unit, means for draining liquid from said separating unit, an auxiliary liquid receptacle in the lower portion of said tank for receiving said drained liquid, said auxiliary receptacle being entirely sealed from communication with said settling chamber, and a discharge conduit extending through the wall of said tank and leading from said receptacle to a point exterior of said tank.

9. A combination separator including a vertically disposed tank, an inlet for a mixture of oil and gas intermediate the vertical extremities of said tank, an oil settling chamber below said inlet, an oil outlet for said settling chamber, an oil and gas separating unit above said inlet, means for conducting gas from said separating unit, a conduit for draining oil from said separating unit, an auxiliary oil receptacle in communication with said conduit for receiving said drained oil, said auxiliary receptacle beng entirely sealed from communication with said oil settling chamber whereby the oil in said chamber is prevented from backing up in said unit, and a discharge conduit leading from said auxiliary receptacle.

10. A combination separator including a vertically disposed tank, a fluid inlet intermediate the vertical extremities of said tank, a settling chamber below said inlet, a liquid and gas separating unit in said tank above said inlet, means for conducting gas from said separating unit, means for draining liquid from said separating unit, an auxiliary liquid receptacle in the lower portion of said tank for receiving said drained liquid, said auxiliary receptacle being entirely sealed from communication with said settling chamber, a discharge conduit extending through the wall of said tank and leading from said receptacle to a point exterior of said tank, and automatic means for controlling the discharge of liquid from said independent receptacle.

11. A combination separator including a vertically disposed tank, a fluid inlet intermediate the vertical extremities of said tank, a settling chamber below said inlet, a liquid and gas separating unit in said tank above said inlet, means for conducting gas from said separating unit, means for draining liquid from said separating unit, an auxiliary liquid receptacle in the lower portion of said tank for receiving said drained liquid, said auxiliary receptacle being entirely sealed from communication with said settling chamber, a discharge conduit extending through the wall of said tank and leading from said receptacle to a point exterior of said tank, and a liquid level float control for regulating the discharge of liquid from said independent receptacle.

12. A liquid and gas separator comprising, an upright tank having an influent inlet for introducing both liquid and gas into said tank intermediate its ends, a liquid collecting chamber in the tank below the inlet thereof, a scrubbing baffle within the tank above the inlet exposed directly to the influent admitted by said inlet, a liquid drain pipe leading downwardly within the tank from said baffle, an auxiliary liquid container within the tank below the inlet of the tank and connected with the drain pipe, a liquid outlet pipe extending from the lower end of the liquid container, a valve for controlling the discharge of liquid from the liquid container, and valve operating means connected with the container and operated by the rise and fall of liquid in said container.

13. A liquid and gas separator comprising, an upright tank having an influent inlet and a liquid collecting chamber therein at its bottom below said inlet, a scrubbing baffle in the upper portion of said tank exposed to the influent admitted by said inlet, a gas escape pipe leading from said tank, a drain pipe leading downwardly within the tank from the baffle and terminating in said tank, a drain container within the tank into which the drain pipe discharges and in which the drained liquid is collected free from separation agitation, a liquid outlet leading from the container through the wall of the tank, a float chamber receiving liquid from the drain pipe and container, a liquid outlet valve connected to the liquid outlet pipe, and a float in the float chamber connected with the liquid outlet valve for operating the same.

JAY P. WALKER.
ELMER R. WILLIAMS.